United States Patent
Vig

(10) Patent No.: US 12,253,384 B2
(45) Date of Patent: Mar. 18, 2025

(54) NETWORK ACCESS CONTROL FOR VEHICLE

(71) Applicant: GM GLOBAL TECHNOLOGY OPERATIONS LLC, Detroit, MI (US)

(72) Inventor: Sandeep Vig, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 223 days.

(21) Appl. No.: 17/975,737

(22) Filed: Oct. 28, 2022

(65) Prior Publication Data

US 2024/0142268 A1 May 2, 2024

(51) Int. Cl.
*G01C 21/00* (2006.01)
*G07C 5/00* (2006.01)

(52) U.S. Cl.
CPC ..... *G01C 21/3896* (2020.08); *G01C 21/3804* (2020.08); *G01C 21/387* (2020.08); *G07C 5/008* (2013.01)

(58) Field of Classification Search
CPC .............. G01C 21/3896; G01C 21/387; G01C 21/3804; G07C 5/008
See application file for complete search history.

(56) References Cited

U.S. PATENT DOCUMENTS

| 9,137,739 B2 * | 9/2015 | Raleigh | ................. H04W 88/08 |
| 2016/0381547 A1 * | 12/2016 | Jain | ......................... H04W 8/02 455/432.1 |
| 2022/0070761 A1 * | 3/2022 | Bonnah | ............... H04L 63/0236 |

* cited by examiner

*Primary Examiner* — Seth A Silverman
(74) *Attorney, Agent, or Firm* — Quinn IP Law

(57) ABSTRACT

A vehicle management system for managing access of an application on a vehicle to a wireless network external to the vehicle. The system may include a network usage controller configured for determining a data usage status for the application to be one of allowed and blocked and a network access manager configured for storing a route for the application to access a server of the wireless network when the data usage status is allowed and for erasing or disabling the route when the data usage status is blocked.

20 Claims, 2 Drawing Sheets

NETWORK ACCESS CONTROL FOR VEHICLE

INTRODUCTION

The present disclosure relates to a vehicle management system for managing network access for a vehicle, such as but not necessarily limited to managing network access to conserve wireless resources expended when an application on the vehicle attempts to communicate with a server connected to a wireless network external to the vehicle.

An application operating on a vehicle may include capabilities for exchanging data or otherwise communicating with a wireless network external to the vehicle. The manner in which the application communicates with the wireless network may vary depending on the communication capabilities of the vehicle, with more and more vehicles, such as automobiles, including capabilities to support communications with cellular, satellite, Wi-Fi, and other wireless, external networks. As part of a preliminary, authorization process typically used to permit an application access to a server in communication with a wireless network, a preliminary amount of data may be exchanged between the application and the wireless network, typically with the wireless network ultimately deciding whether to permit or deny the application access to the server. A wireless network, for example, may deny the application access in the event the vehicle, an operator associated with the vehicle, or another entity responsible for the application lacks entitlements to use the wireless network, e.g., data usage entitlements, such as those purchased through a subscription, may be exhausted, expired, or otherwise insufficient for other reasons, such as due to the vehicle being in a roaming area of the wireless network.

The denial of service due to a lack of entitlements may nonetheless require the wireless network to exchange a preliminary amount of data with the application before the wireless network decides whether to grant the application access to the server. Some wireless networks may relatedly charge fees or require other pecuniary recompense for data exchanged thereover, which, at least in some situations, such as due to mutually agreed upon contractual requirements, may result in a provider of the wireless network charging an original equipment manufacturer (OEM) of the vehicle for the preliminary data consumed when attempting and failing to successfully permit the application access to the server, even if the denial is due to a lack of entitlements or other limitation beyond the control of the OEM. The corresponding charges may be undesirable and costly to the OEM, and as such, desirable to avoid.

SUMMARY

One non-limiting aspect of the present disclosure relates to a vehicle management system for managing network access that may be configured to conserve wireless resources that would otherwise be expended in the event an application unsuccessfully attempts to wirelessly connect with a wireless network and/or a server.

One non-limiting aspect of the present disclosure relates to a vehicle management system for managing access of an application on a vehicle to a wireless network external to the vehicle. The system may include a network usage controller configured for determining a data usage status for the application to be one of allowed and blocked and a network access manager configured for storing a route for the application to access a server of the wireless network when the data usage status is allowed and for erasing or disabling the route when the data usage status is blocked.

The network access manager may be configured to erase or disable the route to prevent the application from performing an authorization process with the wireless network, optionally with the authorization process being required to establish communication between the application and the server.

The network access manager may be configured to prevent the application from exchanging authorization data with the wireless network as part of a request-reply process included as a part of the authorization process. The wireless network may require the application to exchange the authorization data through the route as part of the request-reply process and to successfully complete the authorization process before permitting the application access to the server.

The network access manager erases or disables the route prior to receiving a request from the application for the route, thereby preventing the application from using the route to exchange authorization data with the wireless network.

The network access manager, such as in response to an interrupt, may be configured to erase or disable the route after the application has begun using the route, thereby interrupting the application while using the route to access the wireless network.

The network access manager may transmit an offer message to the application in response to erasing or disabling the route to present the application with an offer to change the application status from blocked to allowed.

The network usage controller may be offboard the vehicle and configured to wirelessly instruct the network access manager to store the route and to erase or disable the route, and optionally configured for determining the data usage status to be blocked when the vehicle is roaming, when a data plan associated with the application is expired, and/or when a data plan associated with the application is exhausted.

The network access manager may be onboard the vehicle.

The network usage controller and the network access manager may be onboard the vehicle.

The network usage controller may be configured for determining the data usage status to be blocked when the vehicle is roaming, when a data plan associated with the application is expired, and when a data plan associated with the application is exhausted.

The network access manager may be configured for providing an alternative route for the application to communicate with the server when erasing or disabling the route, optionally with the alternative route routing network traffic over a secondary wireless network offboard the vehicle.

The wireless network may be a private or cellular network and the secondary wireless network may be a Wi-Fi or public network. In another instance, the wireless network may be secured, and the secondary wireless network may be unsecured.

One non-limiting aspect of the present disclosure relates to vehicle management system for managing access of an application on a vehicle to a server in communication with a wireless network external to the vehicle. The system may include a network usage controller configured for determining a data usage status for the application to be one of allowed and blocked, optionally with the allowed status being determined when data usage entitlements of the application are within specified limits, and the blocked status being determined when one or more of the data usage entitlements are beyond one or more of the specified limits.

The system may further include a network access manager configured for preventing the application from exchanging authorization data with the wireless network as part of an authorization process when the application status is blocked and for permitting the application to exchange the authorization data with the wireless network when the application status is allowed.

The network usage controller may provide a rule to the network access manager for routing the application to the server when the application status is allowed and instructs the network access manage to erase or disable the rule when the application status is blocked.

One non-limiting aspect of the present disclosure relates to a method for routing network traffic from an application on a vehicle to a server in communication with a wireless network external to the vehicle. The method may include determining a data usage status for the application to be one of allowed and blocked, optionally with the allowed status being determined when data usage entitlements of the application are within specified limits, and the blocked status being determined when one or more of the data usage entitlements are beyond one or more of the specified limits. The method may further include preventing the application from exchanging authorization data with the wireless network and the server as part of an authorization process when the application status is blocked, and permitting the application to exchange the authorization data with the wireless network and the server when the application status is allowed.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
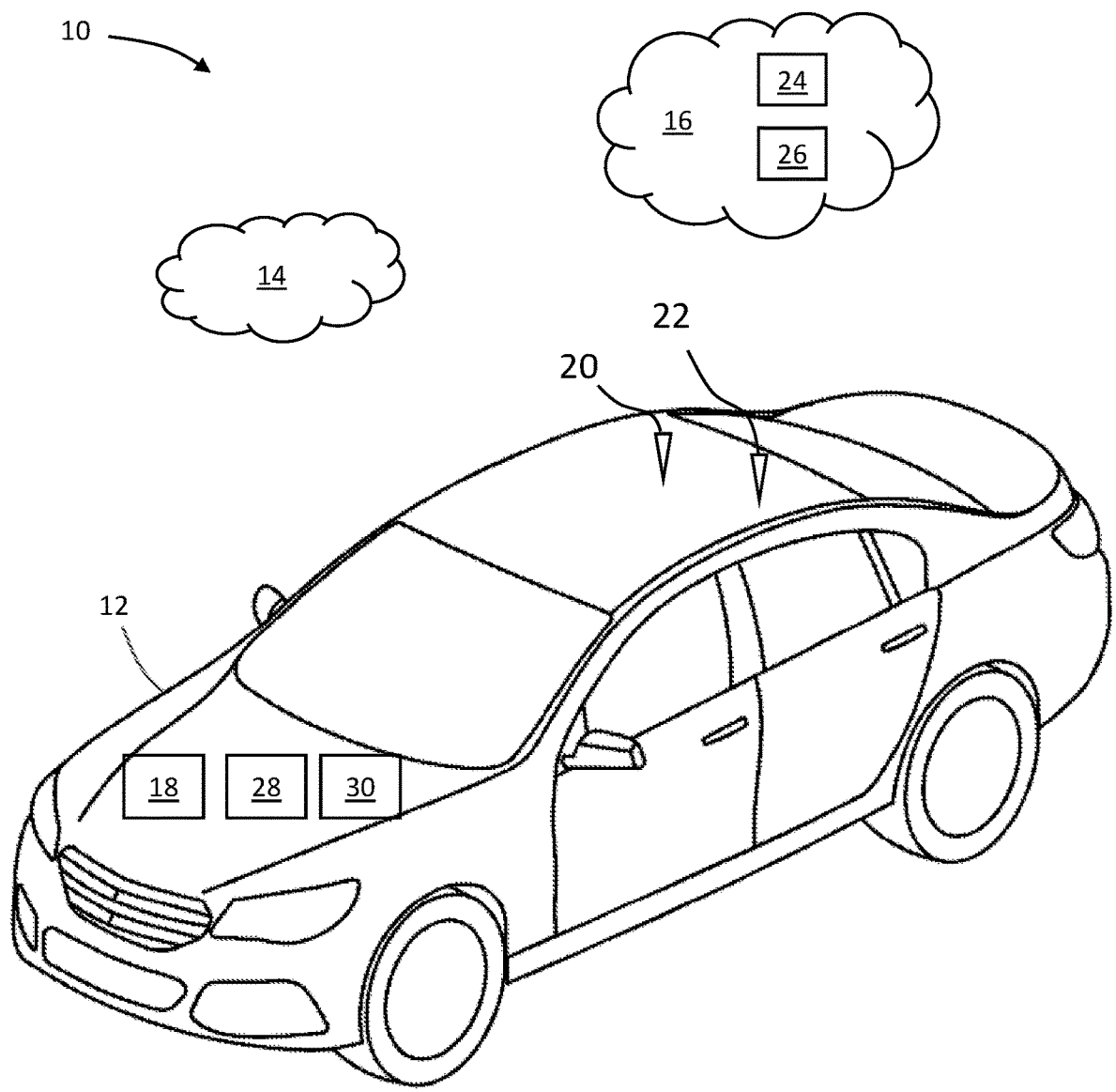
FIG. 1 illustrates a schematic diagram of a vehicle management system for managing network access for a vehicle in accordance with one non-limiting aspect of the present disclosure.

FIG. 1 illustrates a schematic diagram of a vehicle management system 10 for managing network access for a vehicle 12 in accordance with one non-limiting aspect of the present disclosure. The vehicle 12 may include one or more devices, systems, control units, modules, etc., configured to facilitate vehicle related operations, with one or more of the operations being dependent of exchanging data, network traffic, or otherwise communicating with one or more networks 14, 16 external to the vehicle 12. For the sake of explanation and brevity, the vehicle related operations, and the devices, etc., associated therewith, that may be dependent on such external data exchange are generically and collectively referred to herein and in a non-limiting manner as applications 18. While the present disclosure is predominantly described with respect to a singular instance of an application 18 requiring external data communications, one skilled in the art will readily appreciate the vehicle management system 10 being operable and beneficial in managing network access for multiple applications 18, optionally doing so simultaneously and/or in parallel, such that network access may be managed concurrently for each application included on the vehicle 12.

The vehicle 12 is predominately described as an automobile having capabilities sufficient for facilitating independent, wireless communication over a plurality of wireless interfaces 20, 22 for exemplary and non-limiting purposes as the present disclosure fully contemplates the vehicle 12 having other configurations and capabilities. The wireless interfaces 20, 22 are described with respect to a first interface 20 configured to facilitate communications with a first network 14 and a second interface 22 configured to facilitate communications with a second network 16. The first network and interface 14, 20 may be configured, for example, to facilitate public, unsecured and/or Wi-Fi communications, such as with the first interface 20 being configured as a Wi-Fi transceiver and the first network 14 being configured as a Wi-Fi network. The second network and interface 16, 22 may be configured, for example, to facilitate private, secured and/or cellular communications, such as with the second interface 22 being configured as a cellular transceiver and the second network 16 being configured as a cellular network.

The illustrated interfaces 20, 22 are presented in order to highlight one aspect of the present disclosure whereby the vehicle 12 may include capabilities for communicating over free or a subscription-less network, such as the Wi-Fi network 14, and capabilities for communicating over a usage-fee or subscription-based network, such as the cellular network 16. One skilled in the art, however, will appreciate the vehicle management system 10 being beneficial in managing network access for other types of networks and communications, including but not limited to wired and/or wireless communications associated with satellite, near field, Bluetooth, or other types of communication infrastructures. The cellular network 16, as such, is presented as illustrative of one type of wireless network that may charge fees or require other pecuniary recompense for data exchanged thereover, which, at least in some situations, such as due to mutually agreed upon contractual requirements, may result in a provider of the wireless network charging an original equipment manufacturer (OEM) of or other entity associated with the vehicle 12 for data consumed when one of the applications 18 attempts to access webpages, destinations, endpoints, or other entities in communication with the cellular network 16, which for the sake of simplicity may be referred to herein as one or more servers 26.

The vehicle management system 10 may include a network usage controller 24 configured for determining a data usage status for the application 18 onboard the vehicle 12. The network usage controller 24 is shown for exemplary purposes as being part of or in communication with the cellular network 16, however, the network usage controller 24 may be included onboard the vehicle 12 and/or as an entity operating independently of the cellular network 16 and/or vehicle 12, such as at a back office of the OEM. The network usage controller 24 may be configured to facilitate an authorization process whereby a preliminary amount of data, which for simplicity is referred to herein as authorization data, may be exchanged between the cellular network 16 and the cellular interface 22 as part of a request-response process used to facilitate determining whether the application 18 is granted access to one of the servers 26. The network usage controller 24, for example, may include capabilities to for executing cellular network functions, such as Policy Control Function (PCF), Session Management Function (SMF), User Plane Function (UPF), and Charging Function (CHF). The authorization process may correspond with establishing communication protocols, parameters, etc. needed for the wireless exchange of information, data, network traffic, etc. between the application 18 and the wireless network 16 and/or a destination or source address used for communication with the server 26. The application 18 may be granted access to the server 26, and thereby use of the wireless network 16, upon successfully completing the authorization process, with the successful completion thereof optionally being dependent on compatible operating requirements, subscriptions or entitlements, security protections, etc.

The authorization process, or more specifically the request-response process associated therewith, may include the application 18 and the cellular network 16, the network usage controller 24, and/or the server 26 exchanging authorization data with each other, such as with the application 18 transmitting a Domain Name System (DNS) query, receiving a DNS response, transmitting a Transmission Control Protocol (TCP) sync, receiving a TCP sync acknowledgment (ack), transmitting a TCP ack, and/or transmitting a get, request or other message for establishing a session, a protocol data unit (PDU) or other form of communication with a destination, website, etc. available through the cellular network. At a conclusion of the authorization process, the application 18 may transmit a request to the wireless network 22 to create a Hypertext Transfer Protocol (HTTP) session with the server 26. The corresponding get or other message may include an Internet Protocol (IP) address or other identifier of the desired destination, which the network usage controller 24 may inspect to determine whether the corresponding communication is authorized.

The cellular network 16 and/or the network usage controller 24 may include requirements for the application 18 to communicate with a particular server 26, e.g., communications destined for the OEM may be permitted under some circumstances, such as to enable the application 18 to contact the back office to download operating manuals and/or to perform other authorized tasks, whereas communications with other types of server 26 and/or with other entities lacking such pre-approval may be permitted in the event certain requirements are met, such as a data subscription associated with the application 18 being unexhausted or unexpired and/or that the related communications occur in a non-roaming area of the cellular network 16. The network usage controller 24, in other words, may be configured to permit certain types of communication while denying other communications when entitlements or data usage rates have exceeded specified limits, e.g., when data usage has exhausted or exceeded thresholds, when the data subscription has expired, and/or when the vehicle 12 is in a roaming area of the cellular network 16.

In the event the network usage controller 24 denies the application 18 access to the cellular network 16 and/or the sever 26 after at least some of the preliminary, authorization data has been exchanged, wireless resources, data, etc. associated therewith may be considered as wasted in so far as the data having been consumed in making a failed attempt. The wasted resources, which may be quantified in data units or bytes, may result in the OEM, owner of the vehicle 12, operator of the cellular network 16, or other responsible entity being left with an obligation to account for, and in some cases pay for, the attendant consumption of bandwidth, spectrum, etc. as those resources could otherwise have been used for more beneficial purposes than attempting to unsuccessfully connect the application 18 with the cellular network 16. One non-limiting aspect of the present disclosure contemplates avoiding such wasted resources, and optionally saving the related cost and expense, by instead preventing the application 18 from undertaking the authorization process and/or by preventing the application 18 from otherwise unnecessarily consuming bandwidth, spectrum, etc. in attempting to communicate with the sever 26 when the denial thereof may be anticipated or known ahead of time.

The vehicle management system 10 may include a network access manager 28, which is shown for exemplary purposes as being onboard the vehicle 12 as the present disclosure fully contemplates the network access manager 28 being located offboard the vehicle 12. The network access manager 28 may be configured for routing communications between the application 18 and the wireless interfaces and networks 14, 16, 20, 22. The network access manager 28 may be configured, for example, to receive a routing request from the application 18, and based on information therein, such as a traffic descriptor, application identifiers, etc., select a route sufficient for connecting the application 18 with the appropriate one or more of the wireless interfaces and/or networks 14, 16, 20, 22, whereafter the application 18 may undertake an authorization process or other procedure for establishing communication with the server 26. One non-limiting aspect of the present disclosure contemplates the network access manager 28 being configured to store a plurality of rules associated with establishing routes for each of the applications 18 included within the vehicle 12. The rules, for example, may correspond with the User Equipment (UE) Route Selection Policy (URSP) rules as defined in the third generation partnership project (3GPP) technical specification (TS) 23.503 entitled "Policy and charging control framework for the 5G System (5GS), Stage 2", 23.501 entitled "System architecture for the 5G System (5GS)", 23.502 entitled "Procedures for the 5G System (5GS)", 29.525 entitled UE policy control service Stage 3, 24.501 entitled Non-Access-Stratum (NAS) protocol for 5G System (5GS); Stage 3, 24.526 entitled URSP UE Equipment policies for 5G system, 29.513 entitled Policy and Charging Control signaling flows and QoS parameter mapping; Stage 3, 29.507 entitled 5G System; Access and Mobility Policy Control Service, Stage 3.

The network access manager 28 may include or otherwise be associated with a computer readable storage medium and a processor, optionally with the computer readable storage medium being configured to store a plurality of routing rules 30 and a plurality of non-transitory instructions. The instructions may be executable with the processor to facilitate the operations contemplated herein, which may include retrieving, using, erasing, disabling, and otherwise manipulating the routing rules 30 in the manner contemplated herein to conserve wireless resources that would otherwise be expended in the event the application 18 were to unsuccessfully attempt to connect with the server 26 and/or one of the wireless networks 14, 16. The routing rules 30 may be configured according to other protocols and standards besides URSP, and are described for non-limiting purposes with respect to URSP in order to demonstrate one beneficial aspect of the present disclosure whereby the network access manager 28 may be configured to selectively disable, erase, or otherwise manipulate the URSP routing rules 30 to prevent the application 18 from undertaking an authorization operation or to prevent the application 18 from otherwise wasting wireless resources in attempting to communicate with the server 26 when the denial thereof may be anticipated or known ahead of time.

The routing rules 30 stored on the network access manage 28 may correspond with the URSP rules and/or additional and different rules, such as but not necessarily limited to local, default, and non-default rules programmed thereon to facilitate routing communications between the applications 18 onboard the vehicle 12 and the wireless interfaces 20, 22, networks 14, 16, and servers 26. The routing rules 30, as such, may define a number of routes, paths, requirements, etc. for the application 18 to establish wireless signaling with entities external to the vehicle 12, optionally with the corresponding routes defining a set of PDU session attributes, a route selection descriptors (RSD), and/or other information needed for the application 18 to communicate with one of the external, wireless networks 14, 16 and/or servers 26.

One non-limiting aspect of the present disclosure relates to the network usage controller 24 being configured to determine whether one or more of the applications 18 on the vehicle 12, or a user associated therewith, has exceeded entitlements, or otherwise engaged in activities of the type which would result in one of the wireless networks 14, 16 and/or the servers 26 denying to permit the application 18 access. As noted above, the wireless networks 14, 16 may deny access for any number of reasons, such as data usage subscription being exceeded or expired, the vehicle 12 being in a roaming area, etc. The network access manager 28 may be configured to monitor for these conditions, and in the event a situation arises whereby access for one or more applications 18 may be denied, to implement preventative measures aimed at avoiding wasting resources in attempting to subsequently connect the application 18 with the server 26.

The network access manager 28, for example, may be configured to determine a data usage status for each of the applications 18 onboard the vehicle 12, which the network access manager 28 may continuously monitor and update. The data usage status may be used to indicate whether the corresponding application 18 has exceeded entitlements to access one of the wireless networks 14, 16 and/or the server 26 which in the case of the sever 26 being accessed through to the cellular network 14, for example, may include assessing whether data usage subscription associated with the application 18 has expired or been exceeded and/or whether the vehicle 12 is currently roaming. In the event none of the thresholds have been exceeded, the network access manager 28 may set an allowed status for the data usage status, which in may result in the network access manager 28 providing the application 18 a route to the cellular network 16 when requested to do so. In the event one or more of the thresholds have been exceeded, the network access manager 28 may set a blocked status for the data usage status, which in turn may be result in the network access manager 28 denying the application 18 a route to the server 26 when requested to do so and/or otherwise disabling, erasing, or removing the rule 30 previously associated with the application 18.

One non-limiting aspect of the present disclosure contemplates the network access manager 28 being configured to generate routes for the applications 18 according to the URSP rules 30. The URSP rules 30 may be provided to the network access manager 28 by the network usage controller 24 and/or another entity tasked with facilitating connections between the applications 18 and the wireless networks 14, 16. In the case of the network usage controller 24 being configured to provide the rules 30 to the network access manager 28, the network usage controller 24 may update the rules 30 by replacing, erasing, removing, disabling, etc. the existing rules 30, and thereby the routes for the applications 18 having the blocked status. The network usage controller 24 may be operable in this manner to effectively eliminate the rules 30 and routes for the applications 18 having the blocked status such that those applications 18 may be prevented from establishing routes to one of the wireless networks 14, 16 and/or the server 26 preventing or blocking the application 18 from undertaking the authorization process or otherwise communicating with the desired network 14, 16 and/or server 26 and correspondingly preventing the blocked applications 18 from consuming wireless resources in attempting to onboard therewith.

Figure 2:
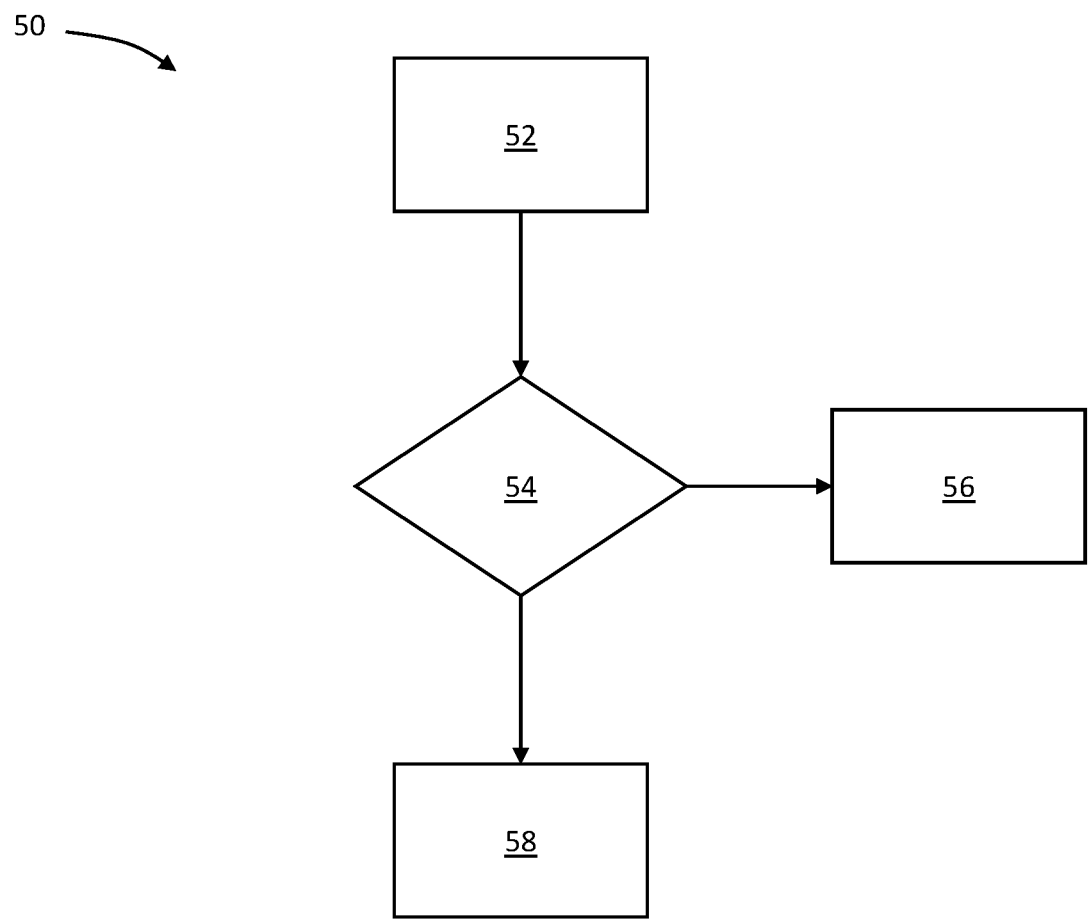
FIG. 2 illustrates a flowchart of a method for managing access of an application on a vehicle to a wireless network external to vehicle in accordance with one non-limiting aspect of the present disclosure.

FIG. 2 illustrates a flowchart 50 of a method for managing access of an application 18 on a vehicle 12 to a wireless network 16 and/or a server 26 external to vehicle 12 in accordance with one non-limiting aspect of the present disclosure. Block 52 relates to a monitoring process whereby the network usage controller 24 or other entity tasked with monitoring the application 18 may collect monitoring information for the application 18, the vehicle 12, an operator of the vehicle 12 and/or the application 18, and/or for other influences on a capability of the application 18 to onboard with the wireless network 16 and/or the server 26. Block 54 relates to a status process for setting a data usage status for the application 18. The status process may include the network usage controller 24 comparing the monitoring data collected for the application 18 to one or more thresholds, values, etc. reflective of a capability of the application 18 to communicate with the wireless network and/or the server 26. Block 56 relates to setting an allowed status for the application 18 when the status process determines the application 18 is capable of successfully communicating with the wireless network 16 and/or the server 26. The setting of the allowed status may include the network usage controller 24 correspondingly providing a rule or a route to the network access manager 28 and/or taking no action in the event the rule or the route is already established or stored on the network access manager 28. Block 58 relates to setting a blocked status for the application 18 when the status process determines the application 18 is incapable of successfully communicating with the wireless network 16 and/or the server 26. The setting of the blocked status may include the network usage controller 24 instructing the network access manager 28 to erase, disable, or otherwise prevent use of a rule or a route associated with the application 18.

The blocking or disabling of a route may occur before the application 18 attempts to communicate therethrough, such as in response to data usage requirements being exceeded or expired, and/or while the application is actively communicating over the route, such as in response to an interrupt, e.g., the data usage rights being exceeded or expired and/or the vehicle 12 moving from a non-roaming area to a roaming area, whereupon the route may be disabled or erased after the application has begun using uses the route so as to interrupt the application while using the route. Optionally, in response to the route being erased or disabled, the network usage controller 24 may transmits an offer message to the application 18, with the offer message presenting the application 18 with an offer to change the application status from blocked to allowed. Optionally, the network access manager 28 may be configured for providing an alternative route for the application 18 when erasing or disabling the route, the alternative route, for example, may be sufficient for routing network traffic or otherwise enabling the application 18 access to another or secondary wireless network, such as a route to the Wi-Fi network 14 when usage of the cellular network 16 is prohibited, which the application 18 may use to communication with the server 26 in the event the server 26 is capable of communicating over the secondary network 14.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A vehicle management system for managing access of an application on a vehicle to a wireless network external to the vehicle, comprising:
    a network usage controller configured for determining a data usage status for the application to be one of allowed and blocked; and
    a network access manager configured for storing a route for the application to access a server of the wireless network when the data usage status is allowed and for erasing or disabling the route when the data usage status is blocked;
    wherein the network access manager is configured for providing an alternative route for the application to communicate with the server when erasing or disabling the route, the alternative route routing network traffic over a secondary wireless network offboard the vehicle; and
    wherein the wireless network is secured and the secondary wireless network is unsecured.

2. The vehicle management system according to claim 1, wherein the network access manager erases or disables the route to prevent the application from performing an authorization process with the wireless network, the authorization process being required to establish communication between the application and the server.

3. The vehicle management system according to claim 2, wherein the network access manager prevents the application from exchanging authorization data with the wireless network as part of a request-reply process included as a part of the authorization process.

4. The vehicle management system according to claim 3, wherein the wireless network requires the application to exchange the authorization data through the route as part of the request-reply process and to successfully complete the authorization process before permitting the application access to the server.

5. The vehicle management system according to claim 1, wherein the network access manager erases or disables the route prior to receiving a request from the application for the route, thereby preventing the application from using the route to exchange authorization data with the wireless network.

6. The vehicle management system according to claim 1, wherein the network access manager in response to an interrupt erases or disables the route after the application has begun using the route, thereby interrupting the application while using the route to access the wireless network.

7. The vehicle management system according to claim 1, wherein the network access manager transmits an offer message to the application in response to erasing or disabling the route, the offer message presenting the application with an offer to change the application status from blocked to allowed.

8. The vehicle management system according to claim 1, wherein the network usage controller is offboard the vehicle and configured to wirelessly instruct the network access manager to store the route and to erase or disable the route.

9. The vehicle management system according to claim 8, wherein the network usage controller is configured for determining the data usage status to be blocked when the vehicle is roaming.

10. The vehicle management system according to claim 8, wherein the network usage controller is configured for determining the data usage status to be blocked when a data plan associated with the application is expired.

11. The vehicle management system according to claim 8, wherein the network usage controller is configured for determining the data usage status to be blocked when a data plan associated with the application is exhausted.

12. The vehicle management system according to claim 8, wherein the network access manager is onboard the vehicle.

13. The vehicle management system according to claim 1, wherein the network usage controller and the network access manager are onboard the vehicle.

14. The vehicle management system according to claim 13, wherein the network usage controller is configured for determining the data usage status to be blocked when the vehicle is roaming, when a data plan associated with the application is expired, and when a data plan associated with the application is exhausted.

15. The vehicle management system according to claim 1, wherein the wireless network is a private or cellular network and the secondary wireless network is a Wi-Fi or public network.

16. A vehicle management system for managing access of an application on a vehicle to a server in communication with a wireless network external to the vehicle, comprising:
   a network usage controller configured for determining a data usage status for the application to be one of an allowed status and a blocked status, the allowed status being determined when data usage entitlements of the application are within specified limits, the blocked status being determined when one or more of the data usage entitlements are beyond one or more of the specified limits;
   a network access manager configured for preventing the application from exchanging authorization data with the wireless network as part of an authorization process when the data usage status is blocked and for permitting the application to exchange the authorization data with the wireless network when the data usage status is allowed; and
   the network access manager configured for storing a route for the application to access a server of the wireless network when the data usage status is allowed and for erasing or disabling the route when the data usage status is blocked;
   wherein the network access manager is configured for providing an alternative route for the application to communicate with the server when erasing or disabling the route, the alternative route routing network traffic over a secondary wireless network offboard the vehicle; and
   wherein the wireless network is secured and the secondary wireless network is unsecured.

17. The vehicle management system according to claim 16, wherein the wireless network is a private or cellular network and the secondary wireless network is a Wi-Fi or public network.

18. The vehicle management system according to claim 16, wherein the network usage controller is offboard the vehicle and configured to wirelessly instruct the network access manager to store the route and to erase or disable the route.

19. A method for routing network traffic from an application on a vehicle to a server in communication with a wireless network external to the vehicle, comprising:
   determining a data usage status for the application to be one of an allowed status and a blocked status, the allowed status being determined when data usage entitlements of the application are within specified limits, the blocked status being determined when one or more of the data usage entitlements are beyond one or more of the specified limits;
   preventing the application from exchanging authorization data with the wireless network and the server as part of an authorization process when the application status is blocked;
   permitting the application to exchange the authorization data with the wireless network and the server when the application status is allowed; and
   providing an alternative route for the application to communicate with the server when erasing or disabling the route, the alternative route routing network traffic over a secondary wireless network offboard the vehicle; and
   wherein the wireless network is secured and the secondary wireless network is unsecured.

20. The method according to claim 19, wherein the wireless network is a private or cellular network and the secondary wireless network is a Wi-Fi or public network.

* * * * *